Figure 1:
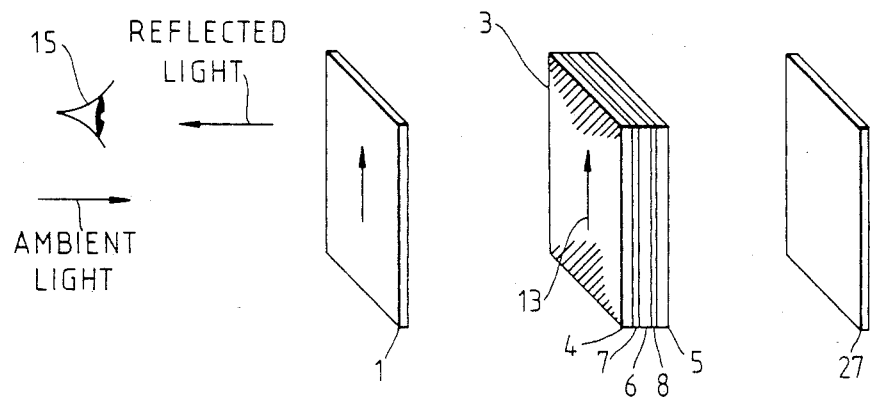

United States Patent

Harrison et al.

[11] Patent Number: 4,506,957
[45] Date of Patent: Mar. 26, 1985

[54] LIQUID CRYSTAL MATERIALS CONTAINING PLEOCHROIC ANTHRAQUINONE DYES

[75] Inventors: Kenneth J. Harrison; Edward P. Raynes, both of Malvern Link; Frances C. Saunders, Malvern Wells; David J. Thompson, Manchester; David F. Newton, High Compton, all of England

[73] Assignee: The Secretary of State for Defence in Her Britannic Majesty's Government of the United Kingdom of Great Britain and Northern Ireland, London, England

[21] Appl. No.: 482,711

[22] Filed: Apr. 6, 1983

[30] Foreign Application Priority Data

Apr. 7, 1982 [GB] United Kingdom ............... 8210345
Aug. 18, 1982 [GB] United Kingdom ............... 8223852

[51] Int. Cl.³ .................... C09K 3/34; C02F 1/13
[52] U.S. Cl. .................... 350/349; 252/299.1; 252/299.63; 260/378; 260/380; 260/383; 350/346; 350/350 R
[58] Field of Search ............ 260/378, 380, 383; 252/299.1; 350/350 R, 346

[56] References Cited

U.S. PATENT DOCUMENTS

| | | | |
|---|---|---|---|
| 4,232,950 | 11/1980 | Benham | 252/299.1 |
| 4,363,743 | 12/1982 | Moeller et al. | 252/299.1 |
| 4,391,489 | 7/1983 | Harrison et al. | 350/349 |
| 4,391,754 | 7/1983 | Rehfrew | 252/299.1 |

FOREIGN PATENT DOCUMENTS

| | | | |
|---|---|---|---|
| 26004 | 4/1981 | European Pat. Off. | 252/299.1 |
| 38460 | 10/1981 | European Pat. Off. | 252/299.1 |
| 44893 | 2/1982 | European Pat. Off. | 252/299.1 |
| 49036 | 4/1982 | European Pat. Off. | 252/299.1 |
| 2920730 | 11/1979 | Fed. Rep. of Germany | 252/299.1 |
| 2037803 | 7/1980 | United Kingdom | 252/299.1 |
| 2081736 | 2/1982 | United Kingdom | 252/299.1 |

*Primary Examiner*—Teddy S. Gron
*Attorney, Agent, or Firm*—Cushman Darby & Cushman

[57] ABSTRACT

A material suitable for a guest-host liquid crystal device comprises a solution of a liquid crystal material and a pleochroic dye characterized in that the dye comprises at least one anthraquinone compound free from water-solubilizing and ionic substituents and having the formula:

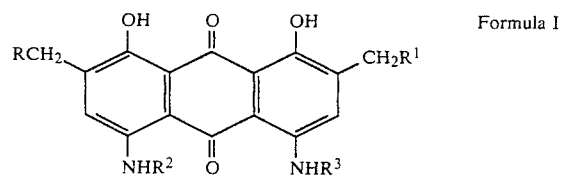

Formula I wherein each of R and $R^1$ independently represents an n-alkyl group having from 4 to 7 carbon atoms inclusive and wherein each of $R^2$ and $R^3$ is independently selected from hydrogen and alkyl groups having from 1 to 4 carbon atoms inclusive.

36 Claims, 3 Drawing Figures

LIQUID CRYSTAL MATERIALS CONTAINING PLEOCHROIC ANTHRAQUINONE DYES

The present invention is concerned with organic materials, in particular with pleochroic dyes in solution with liquid crystal materials, eg for electro-optic display applications.

Liquid crystal materials are well known organic materials which display phases, known as liquid crystal phases or mesophases, having a degree of molecular ordering intermediate between that of the fully ordered crystalline solid state and the fully disordered isotropic liquid state.

Electro-optical devices incorporating liquid crystal materials are well known and widely used as digital displays in such applications as watches, calculators and digital voltmeters. These devices utilise the optical contrast when an electric field is applied across a thin insulating film of suitable liquid crystal material. The molecules of the material (in a liquid crystal phase at the temperature of operation) are re-orientated by the field causing a change in an optical property of the part of the film where the field is applied, eg a change in ambient light scattering or transmissivity.

Most of the liquid crystal display devices currently used in consumer based applications operate by the twisted nematic electro-optical effect in which the optical activity of a film of nematic liquid crystal material having a twisted molecular configuration is voltage dependent allowing the film to be switched between states of different transmissivity when the film is contained in the form of a cell between optical polarisers. Although devices of this type are ideally suited to applications requiring low voltages and low power consumption they suffer from a number of limitations inherent in their mode of operation.

In particular, use of two polarisers is undesirable because they are relatively expensive, difficult to handle, degrade in moisture and create a dull appearance. Furthermore, the optical contrast of twisted nematic devices at wide angles of view is poor.

Liquid crystal materials have the property that their molecules can impose their ordering upon the molecules of other suitable dopant materials incorporated within them. This property is the basis of so-called "guest-host" devices, e.g. display devices in which the host liquid crystal material and its guest material have one molecular configuration in the absence of an applied electric field and another molecular configuration when an electric field is applied across the material. The guest material is usually a pleochroic dye, which is a dye whose molecular absorption properties vary with the orientation of the electric vector of light incident upon its molecules.

The presence of such a dye can be used to enhance the contrast between the off state (with no electric field applied) and the on state (with electric field applied) of a liquid crystal display because the orientation of the dye molecules is in effect switchable by the effect of the applied electric field on the liquid crystal molecules and by the consequent re-orientation of the dye molecules by the guest-host effect.

As discussed further below there are several kinds of liquid crystal effects which can make use of the guest-host effect in electro-optical displays. These vary according to the kind of liquid crystal material used and the configuration of its molecules in the off state (e.g. as determined by the surface treatments of the substrates employed to contain the film of liquid crystal material).

Electro-optical displays of the guest-host kind, particularly those which operate by the so-called phase change electro-optical effect, have the advantages that they do not require two polarisers, their optical contrast at wide viewing angles can be improved and they can be formed by depositing a liquid crystal cell directly on an active substrate.

In order to provide maximum contrast between the on and off states of a guest-host crystal display it is important that the guest molecules adopt as closely as possible the time averaged orientation of the host molecules. However this is achieved only to a limited degree because of random thermal fluctuations. The degree to which the orientation varies from the ideal is measured by a quantity known as the order parameter S which is given by the following equation:

$$S = \tfrac{1}{2}(3 \cos^2 \theta - 1) \qquad \text{Equation (1)}$$

where $\cos^2 \theta$ is a time averaged term and $\theta$ is the instantaneous angular orientation of the molecules with respect to the time averaged orientation of the host molecules. The determination of the value of the order parameter S is well understood in the art; see for example the paper "A new absorptive mode reflective liquid crystal display device" by D. L. White and G. N. Taylor in the Journal of Applied Physics, 1974, 45 pages 4718 to 4723.

For perfect orientation the order parameter S is unity (that is $\theta$ is zero). Thus, pleochroic dyes for use in guest-host devices should have an order parameter in the liquid crystal host as high as possible (i.e. less than one but as near to one as possible). However they must also have adequate chemical, photochemical and electrochemical stability, e.g. stability when exposed to atmospheric contaminants, electric fields (as in device operation) and to ultra-violet radiation. They should not be ionic or have any ionisable character (otherwise the liquid crystal material will lose its insulating nature and conduct making the device useless). They must also have sufficient solubility in the host materials; although the concentration of guest pleochroic dye required for the desired effect is generally quite small (e.g. not more than a few percent of dye) nevertheless many pleochroic dyes are unsuitable because they are essentially insoluble in liquid crystal materials.

It is known from UK Patent Application GB No. 2081736A that dyes of the formula:

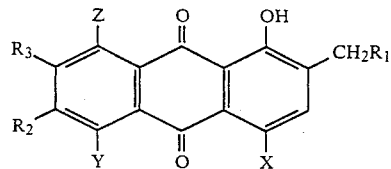

Formula A wherein
$R_1$ represents alkyl or aryl;
X represents H, $NH_2$ or $NHCH_3$;
one of Y and Z is OH and the other is H, $NH_2$ or $NHR_4$ where $R_4$ is $NHCH_3$ and
one of $R_2$ and $R_3$ is H and the one that is ortho to the OH group is a $CH_2R_1$ group,
have pleochroic properties and are therefore useful, in conjunction with liquid crystal materials, for electro-optic displays. It has now been found that certain anthraquinone compounds within this class have unexpectedly high solubilities in liquid crystal materials and high order parameters. They are thus of especial value for use in electro-optic displays based on the liquid crystal guest-host effect.

According to the present invention, in a first aspect, a material suitable for a guest-host liquid crystal device comprises a solution of a liquid crystal material and a pleochroic dye wherein the pleochroic dye comprises at least one anthraquinone compound free from water solubilising and ionic substituents and having the formula:

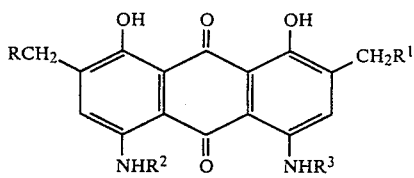

Formula I wherein
R and $R^1$, each independently, represents $C_{4-7}$-n-alkyl; and
$R^2$ and $R^3$, each independently, represents H or $C_{1-4}$-alkyl.

A preferred compound according to Formula I is one in which the radicals represented by R and $R^1$ are the same and in an especially preferred compound both R and $R^1$ are n-butyl or n-hexyl. The latter compounds combine high solubility, high order parameter, and good stability.

It is also preferred that the radicals represented by $R^2$ and $R^3$ are either both H or one is H and the other is $C_{1-4}$-alkyl. The compound in which both $R^2$ and $R^3$ are H generally has a higher order parameter than those in which one, or both, of $R^2$ and $R^3$ is $C_{1-4}$-alkyl, but the latter compounds, particularly where one, or both, of $R^2$ and $R^3$ is methyl, have absorption maxima at higher wavelengths and thus greener shades. These compounds of greener shade are especially suitable for mixture shades and particularly for the preparation of neutral black shades in admixture with the yellow and red pleochroic dyes described in UK Specification GB No. 2082196A and UK Application No. 8203421 and the blue pleochroic dyes described in the present specification.

A useful indication of the ability of a dye to give good contrast is the product of the molar extinction coefficient and the solubility (in moles/liter). Solutions of dyes in liquid crystal compositions for use in electronic display applications preferably have a value for this product of at least 500 cm$^{-1}$ and more preferably at least 750 cm$^{-1}$. As the molar extinction coefficient for a dye does not vary significantly from one liquid crystal material to another, the preferred value of the product can be used to calculate the preferred minimum solubility of a particular dye in any liquid crystal material in order to give good contrast. Thus for a dye having a molar extinction coefficient of 10,000 cm$^2$·moles$^{-1}$ solubility is preferably at least $5.0 \times 10^{-2}$ moles/liter and more preferably at least $7.5 \times 10^{-2}$ moles/liter. For a dye having a molar extinction coefficient of 15,000 cm$^2$·moles$^{-1}$ the solubility is preferably at least $3.3 \times 10^{-2}$ moles/liter and more preferably at least $5.0 \times 10^{-2}$ moles/liter. For a dye having a molar extinction coefficient of 20000 cm$^2$·moles$^{-1}$ the solubility is preferably at least $2.5 \times 10^{-2}$ moles/liter and more preferably at least $3.7 \times 10^{-2}$ moles/liter. The compounds of the present invention generally have high solubilities and high extinction coefficients.

Compounds for use in liquid crystal displays should preferably be as pure as possible in terms of their freedom from inorganic and other ionisable materials which can interfere with the operation of the display or products which are radiation sensitive and decompose within the display during operation. They should also preferably be free from non-pleochroic or inferior pleochroic materials, such as starting materials, intermediates and by-products, which do not contribute to the perceived contrast of the display. To obtain the compounds in a pure form, i.e. substantially free from interfering or deleterious matter, it is generally desirable to submit them to repeated recrystallisations from organics solvents, such as chloroform, and/or chromatographic separation procedures.

Where the compound according to the first feature of the invention is for use as in an electro-optical display, its addition to the liquid crystal material raises the viscosity of the latter and thus tends to increase the response time of the display. It is therefore desirable to use as little as possible, but sufficient to give an adequate electro-optical contrast. In this respect the compounds of Formula I are of particular value because many of them have high extinction coefficients and thus only small quantities, generally less 7%, by weight, are required in the liquid crystal material.

Although a guest-host device may require significantly less than 7% by weight of each dye compound incorporated in the liquid crystal material to operate at room temperature (20° C.) solubilities of dyes in liquid crystal materials diminish as the temperature falls and in order to obtain a reasonable solubility at lower temperatures the solubility at room temperature of each dye compound used may need to be about 7%, by weight, or even higher, e.g. up to 10% or more, by weight.

The compounds of Formula I exhibit high order parameter and solubility in a variety of liquid crystal host materials, including materials of both positive and negative dielectric anisotropy.

Examples of suitable host materials are as follows:
a. Mixtures of PECH compounds (50 to 80% by weight) a mixture of compounds of Formula Q1 as follows:

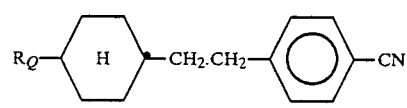

Formula Q1 wherein $R_Q$ is n-alkyl having preferably to 2 to 9 carbon atoms inclusive, together with a high clearing point material (5 to 50%) eg one or more compounds of Formula Q2 as follows:

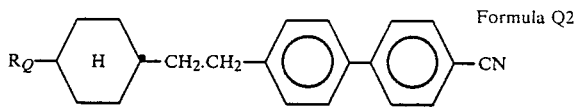

Formula Q2

(A high clearing point material is a compound having a liquid crystal to isotropic liquid transition at a high temperature, eg greater than 80° C., preferably greater than 100° C.);

Compounds of Formula Q1 and Q2 are the subject of UK Pat. No. 2,023,136 B.

b. Mixtures incorporating cyanobiphenyls preferably together with a few percent (5 to 40 percent) of a material having a high clearing point eg a cyano-p-terphenyl compound, such as the materials E7 and E43 marketed by BDH Chemicals Ltd, of Broom Road, Poole, Dorset, England.

c. Mixtures incorporating cyanophenyl cyclohexane (PCH) compounds preferably together also with a few percent of a high clearing point material such as a cyanobiphenyl cyclohexane compound, eg the material ZLI 1132.

d. Mixtures incorporating at least one cyanobiphenyl and at least one cyanophenylpyrimidine compound, preferably together also with a few percent of a high clearing point compound, eg a cyanophenylpyrimidinephenyl compound, eg the material RO TN 30.

e. Mixtures incorporating a mixture of esters of the general formula E as follows

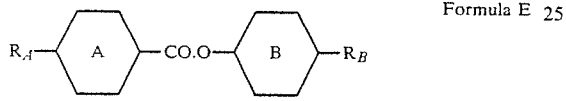

Formula E where $R_A$ and $R_B$ are alkyl or alkoxy groups and the rings A and B are alicylic or aryl groups optionally carrying a lateral substituent, such as fluorine, eg

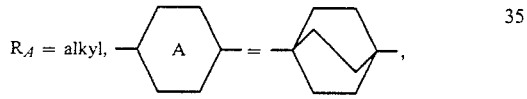

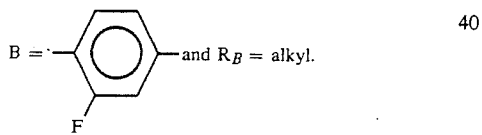

It has been found that particularly suitable host liquid crystal materials are those which contain a mixture including roughly equal proportions by weight of 4-n-alkyl- or alkoxy-4-cyanobiphenyls and 1-(4'-cyanophenyl)-4-n-alkylcyclohexanes together forming between about 60 and 80% by weight of the mixture together with one or more materials of high clearing point.

In general, the host material may incorporate one or more compounds selected from the following known families:

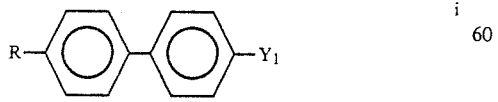  i

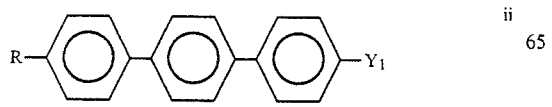  ii

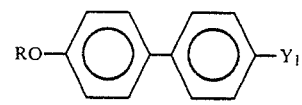  iii

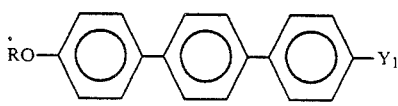  iv

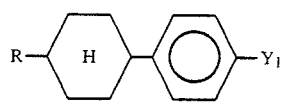  v

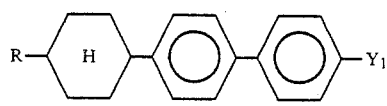  vi

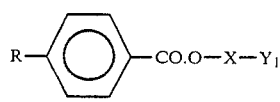  vii

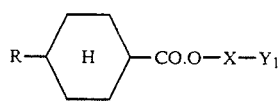  viii

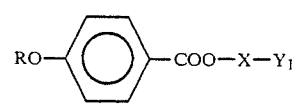  ix

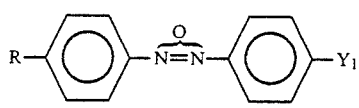  x

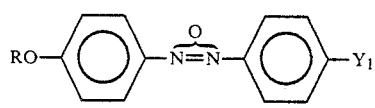  xi

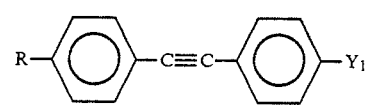  xii

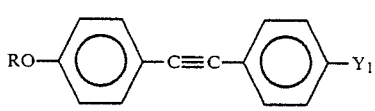  xiii

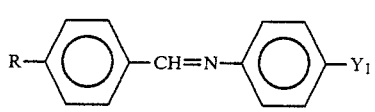  xiv

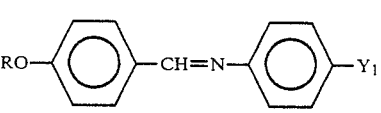  xv

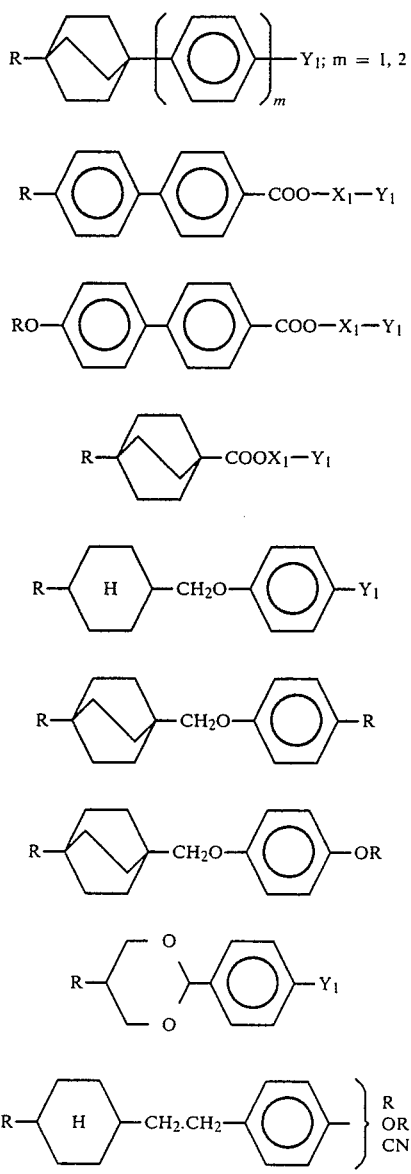

where

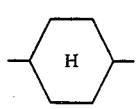

is a trans, 1,4 substituted cyclohexane ring,

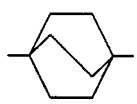

is a 1,4 substituted bicyclo(2.2.2)octane ring, $X_1$ is a 1,4 phenylene group

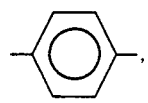

or a 4,4' biphenylyl group

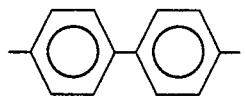

or a 2,6 naphthyl group

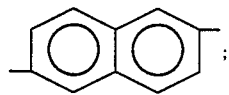

and $Y_1$ is CN, or $R^1$, $OR^1$ or CO. $O—X_1—Y^1$ where $Y^1$ is CN, or $R^1$ or $OR^1$; $R^1$ and R being alkyl, preferably n-alkyl having 1 to 9 carbon atoms.

Solutions of dye and liquid crystal material may be made in a conventional way simply by mixing the dye and the liquid crystal material together and then heating the mixture at about 80° C. with stirring for about 10 minutes and then allowing the mixture to cool.

Pleochroic dye compounds of Formula I may be mixed together with other pleochroic dye compounds (which may or may not be of Formula I) to extend their spectral absorption properties when dissolved in liquid crystal material. For example, where a dye compound of Formula I is blue or blue/green it may be mixed with yellow and red dye compounds or yellow, red and orange dye compounds to produce a neutral 'black' mixture.

The following are examples of constituents of a suitable black dye mixture (i) a blue dye of Formula I, preferably wherein $R^2$ and $R^3$ are both H;

(ii) a purple/red dye of Formula P as follows (iii) a yellow dye of Formula Y as follows
where Formula P is:

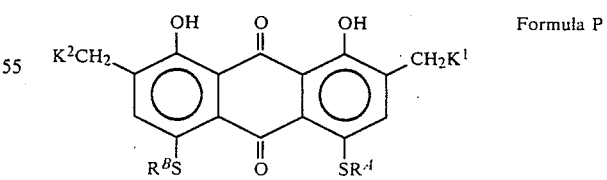

Formula P wherein $K^1$ and $K^2$ are alkyl, preferably n-alkyl groups having from 3 to 12 carbon atoms, S is sulphur, and $R^A$ and $R^B$ are aryl, preferably phenyl or 4-alkyl-substituted phenyl groups of which one is preferably phenyl and the other is preferably 4-alkylphenyl having a branched alkyl group containing from 3 to 8 carbon atoms; and where Formula Y is:

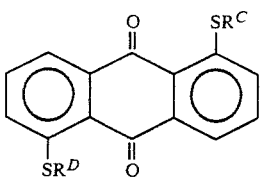

Formula Y wherein $SR^C$ and $SR^D$ have respectively the same definitions as $SR^A$ and $SR^B$ above.

Dyes of other colours may be included in the mixture eg orange dyes of Formula O as follows:

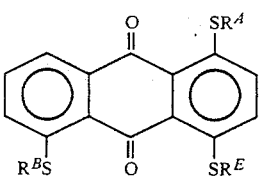

Formula O wherein $SR^A$ and $SR^B$ are as defined above and $SR^E$ is a further phenylthio or 4-alkylphenylthio group; or blue/green dyes of Formula I wherein one or both of R and $R^1$ is methyl.

Examples of suitable dye mixtures are given below.

The relative proportions of the dyes mixed together are determined by the desired spectral response. This is an absorption curve extending across the spectrum to give a grey colouration. The dye mixture is then used with liquid crystal material as above or as follows.

According to the present invention in a second aspect a liquid crystal electro-optical display includes two electrically insulating substrates at least one of which is optically transparent, electrodes on the inner surfaces of the substrates and a film of dielectric material contained between the electrodes and the substrates, wherein the dielectric material is material according to the first aspect of the invention as defined above.

The liquid crystal/dye solution which is the material according to the first aspect of the invention may be used in any known electro-optical display as defined in the second aspect. Examples, which will be familiar to those skilled in the liquid crystal art, are the known devices operating by the following effects:

a. THE TWISTED NEMATIC EFFECT

In this case a film of nematic liquid crystal material of positive dielectric anisotropy has an off state in which (the long axes of) its molecules lie in the plane of the device substrate inner surfaces (which are normally parallel to one another), or at a small angle thereto, and undergo roughly a $\pi/2$ helical twist in orientation from one substrate to the other by virtue of the orientations at the surfaces caused by treatment, eg unidirectional rubbing, of those surfaces prior to assembly. This is the twisted "homogeneous texture". Application of an electric field between the electrodes on the respective substrate inner surfaces to give the on state causes re-arrangement of the liquid crystal molecules to lie (with their long axes) effectively perpendicular to the substrate inner surfaces in the "homeotropic texture". A change in optical activity (rotary power) of the film occurs between the on and off states by virtue of the molecular re-arrangement and the optical effect observed can be enhanced by the use of a linear polariser adjacent to one of the substrates and pleochroic dye dissolved in the liquid crystal material. The polariser has its polarisation axis parallel to the direction of the liquid crystal molecules at the adjacent substrate inner surface (or, more strictly, parallel to the average axis of projection of the molecules on that surface). By the guest-host effect the dye causes the off state to appear relatively dark or strongly colour whereas the on state appears clear or weakly coloured.

b. THE FRÉEDERICKSZ EFFECT IN NEGATIVE NEMATICS

In this case a film of nematic liquid crystal material of negative dielectric anisotropy has an off state in which its molecules lie perpendicular (ie in the homeotropic texture) to the substrate inner surfaces (which are parallel) by virtue of surface treatments to these inner surfaces prior to assembly. A single polariser is placed adjacent to one substrate with its transmission axis perpendicular to the normal to the inner surfaces. Application of an electric field between the electrodes on the respective substrate inner surfaces to give the on state causes re-arrangement of the liquid crystal molecules to lie parallel to the substrate inner surfaces (ie in the homogeneous texture). Incorporation of pleochroic dye in the liquid crystal material ensures that the off state appears relatively clear or weakly coloured whereas the on state appears dark or strongly coloured. The effect observed is enhanced by the presence of the polariser.

c. THE FRÉEDERICKSZ EFFECT IN POSITIVE NEMATICS

In this case a nematic liquid crystal material of positive dielectric anisotropy has an off state in which the molecules lie roughly parallel and in the plane of the substrate inner surfaces (which are parallel) by virtue of treatment of those surfaces prior to assembly (ie the homogeneous texture). A single polariser is placed adjacent to one substrate with its transmission axis parallel to the substrate inner surfaces.

Application of an electric field between the electrodes on the respective substrate inner surfaces to give the on state causes re-arrangement of the liquid crystal molecules to lie perpendicular to the substrate inner surfaces, ie the homeotropic texture. Incorporation of pleochroic dye in the liquid crystal material ensures that the off state appears relatively dark or strongly coloured whereas the on state appears colourless or weakly coloured as in the twisted nematic effect above. The effect observed is enhanced by the presence of the polariser.

d. THE PHASE CHANGE EFFECT (NEGATIVE CONTRAST TYPE)

In this case a cholesteric liquid crystal material of positive dielectric anisotropy and long molecular helical pitch, typically 2 μm, has an off state in which its molecules lie in random helices, ie the "focal conic texture". Application of an electric field between the electrodes on the respective substrate inner surfaces to give the on state causes re-arrangement of the liquid crystal molecules to lie perpendicular to the substrate inner surfaces (ie the homeotropic texture as for positive nematics in the Fréedericksz effect). Incorporation of pleochroic dye in the liquid crystal material gives an off state which appears relatively dark or strongly coloured and an on state which appears colourless or weakly coloured.

e. THE PHASE CHANGE EFFECT (POSITIVE CONTRAST TYPE)

In this case a cholesteric liquid crystal material of negative dielectric anisotropy and long molecular helical pitch has on off state in which its molecules lie perpendicular to the substrate inner surfaces, ie in the homeotropic texture. Application of an electric field between electrodes on the respective substrate inner surfaces causes re-orientation of the molecules to lie in the plane of the substrate inner surfaces in a helical arrangement ie the twisted homogeneous texture. Incorporation of pleochroic dye in the liquid crystal material gives an off state which is relatively colourless or weakly coloured and an on state which is relatively dark or strongly coloured.

f. THE FRÉEDERICKSZ EFFECT IN SMECTICS

In this case a smectic A liquid crystal material of positive dielectric anisotropy having a dielectric relaxation frequency fc less than about 10 kHz (ie the material has a negative dielectric anisotropy above this frequency) has an off state in which its molecules lie roughly parallel to the substrate inner surfaces with the molecules at the two inner surfaces parallel as in the Fréedericksz effect (c). Application of an electric field with a frequency less than fc to give the on state causes re-orientation of the liquid crystal molecules to lie perpendicular to the substrate inner surfaces, is in the homeotropic texture. The on state is preserved when the field is removed. Clearing of the on state may be achieved by the application of a high frequency electric field, ie with a frequency >fc. A single polariser is used, as with the Fréedericksz effect (c) above, when the molecular alignment at the two substrate inner surfaces in the off state is parallel. Incorporation of pleochroic dye in the liquid crystal material gives an off state which is relatively dark or strongly coloured and an on state which is clear or weakly coloured.

Of the above effects the phase change effect (negative contrast type) is preferred.

Use of the material defined in the first aspect of the invention above is not limited to electro-optical displays (as defined in the second aspect). The material may, in fact, be used in any known application of a dyed liquid crystal material. An example of such a 'non electro-optical' application is a thermally addressed display in which a symbol or character is provided in a smectic or cholesteric material by selective heating of the material eg by a laser (eg He/Ne) beam, to produce a localised change in the molecular texture of the material. The dye enhances the contrast between the different regions of the display, ie between those which are selectively heated and those which are not heated.

A process for the preparation of a compound according to Formula I, wherein $R^2$ and $R^3$ are both hydrogen, comprises nitrating a compound of the formula

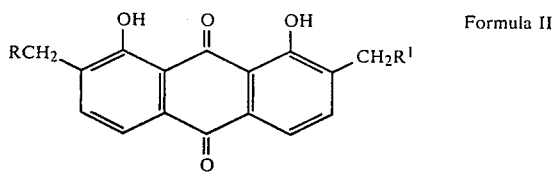

Formula II wherein R and $R^1$, each independently, represents $C_{4-7}$-n-alkyl, to give a 2,7-di-($C_{4-7}$-n-alkyl)-4,5-dinitrochrysazin and reducing the 2,7-di-($C_{4-7}$-n-alkyl)-4,5-dinitrochrysazin to a 2,7-di-($C_{4-7}$-n-alkyl)-4,5-diaminochrysazin. This process is the subject of a copending patent application.

The two stages of this reaction, i.e. nitrogen and reduction, may be carried out using conventional reagents. For example, nitration may be performed using a mixture of concentrated nitric and sulphuric acids and reduction may be performed using a mixed sulphur/sodium sulphide reducing agent.

A compound of Formula I in which $R^2$ and/or $R^3$ are alkyl can be prepared by alkylation of the compound in which $R^2$ and $R^3$ are hydrogen, e.g. by reaction with a $C_{1-4}$-alkanol in the presence of boric acid and concentrated sulphuric acid. In this way a $C_{1-4}$-alkyl group may be introduced into one or both of the amino groups. The alkylation generally leads to a mixture of compounds containing no, one or two $C_{1-4}$-alkyl groups which may be used as such or separated into its components by chromatography and/or fractional crystallisation. The shade of the mixture may be adjusted by blending with other pleochroic dyes.

The intermediate compound of Formula II, wherein R and $R^1$ each independently represents $C_{4-7}$-n-alkyl, may be prepared by the reaction of chrysazin or leucochrysazin with one or more aldehydes of the formula RCHO and $R^1$CHO, wherein R and $R^1$ are $C_{4-7}$-n-alkyl, in the presence of pyridine.

This alkylation reaction is preferably performed with leuco-chrysazin which may be prepared in situ by reduction of chrysazin with alkaline dithionite. The reaction medium is preferably aqueous pyridine, especially comprising from 10:1 to 1:1, by weight, water:pyridine. It is surprising that this reaction proceeds so effectively with n-alkyl aldehydes because, in the absence of pyridine, n-alkyl aldehydes generally undergo an aldol condensation which competes with the desired alkylation and reduced the yield of the intermediate 2,7-dialkylchrysazin. This alkylation may be performed at a temperature from 20° C. to 100° C., especially from 50° C. to 90° C., for a period of from 1 to 24 hours, preferably from 2 to 8 hours. Where a mixture of two different aldehydes is used the product will comprise a mixture of two symmetrical compounds of Formula II in which R and $R^1$ are the same and one unsymmetrical compound of Formula II in which R and $R^1$ are different. If desired, the components may be separated from the mixture by chromatography before conversion into a compound of Formula I or the mixture may be converted directly into a mixture of compounds according to Formula I. For the preferred product, in which the radicals R and $R^1$ are identical, at least two, and preferably up to about three, moles of an aldehyde, RCHO, in which R is $C_{4-7}$-n-alkyl, may be used for each mole of chrysazin. For the product in which R and $R^1$ are different for 1 to 1.5 moles of each aldehyde may be used for each mole of chrysazin.

The compounds of Formula I are not only superior to the homologous compounds in which R and $R^1$ are lower (<$C_4$) or higher (>$C_7$) alkyl radicals but they are also superior to the isomeric compound derived from anthrarufin in which the OH groups are in the 1 and 5, the —$NHR^2$ and $NHR^3$ groups are in the 4 and 8 and the —$CH_2R$ and —$CH_2R^1$ groups are in the 2 and 6 positions.

In the following Examples, in which all parts and percentages are by weight unless otherwise indicated, examples of the preparation and properties of examples of compounds of Formula I and mixtures incorporating them will be given.

EXAMPLE 1

(a) Preparation of 2,7-Di-n-pentylchrysazin

Chrysazin (120 g) was stirred into a solution of 120 g of sodium hydroxide in a mixture of water (1500 ml) and pyridine (220 ml) at 55° C. Sodium hydrosulphite (200 g) was added to the mixture which was stirred under $N_2$ for 30 minutes before addition of a further 100 g of sodium hydrosulphite. To this reaction mixture was added, dropwise over a period of 30 minutes, n-pentanal (142 g) and the mixture stirred for 2 hours at 80° C. still under $N_2$. The mixture was then cooled to room temperature, poured into an acidified ice/water mixture (ice/water: 4 liters and 35% HCl: 700 ml), in which it was stirred for 2 hours, filtered and the filter cake washed with water. The tarry cake was slurried in 400 ml of ethyl acetate, filtered, washed with methanol and pulled until damp-dry. This paste was recrystallised from ethyl acetate to give 56 g of dry product (yield 29.5%) melting at 127° C. Elemental analysis gave C=76.1% (75.8%) and H=7.5% (7.4%).

(b) Preparation of 2,7-Di-n-pentyl-4,5-dinitrochrysazin 2,7-Dipentylchrysazin (56 g) was stirred in 800 ml of 98% sulphuric acid at room temperature for 30 minutes and then cooled to 0° C. To the cooled mixture was added, dropwise over a period of 30 minutes, whilst maintaining the temperature <10° C., 160 ml of of an anhydrous nitration acid, comprising 33% nitric acid and 67% sulphuric acid, and the mixture stirred for 2 hours at <10° C. The mixture was then poured into 4 liters of ice/water, stirred at room temperature for 30 minutes, filtered, washed acid-free and dried to give 50.5 g (yield 73%) of dry product melting at 140° C. Elemental analysis gave C=58.8% (61.3%), H=5.4% (5.5%) and N=5.5% (6.0%)

(c) Preparation of 2,7-Di-n-pentyl-4,5-diamino-chrysazin 2,7-Di-n-pentyl-4,5-dinitrochrysazin (6 g) was stirred into a mixture of 200 ml water and 50 ml pyridine at 20° C. To this mixture was added a mixed sulphur/sulphide reduction liquor, containing 25 g sodium sulphide and 3 g sulphur in 20 ml water, and the mixture stirred at 90° C. until reaction was complete (1 hour). After a further period of 30 minutes at 90° C. the mixture was filtered hot and the cake was washed sequentially with water and methanol and dried to give 4.6 g dry product (yield 88.4%) melting at 164°–7° C.

EXAMPLE 2

(a) Preparation of 2,7-Di-n-heptyl-chrysazin

The process of Example 1(a) was repeated except for the replacement of the 142 g of of n-pentanal with 171 g of n-heptanal. The quantity of dry product was 103 g (yield 47.6%) which melted at 116°–118° C. Elemental analysis gave C=76.1% (75.8%) and H=7.5% (7.4%).

(b) Preparation of 2,7-Di-n-heptyl-4,5-dinitrochrysazin

The process of Example 1(b) was repeated using 87.2 g of 2,7-di-n-heptylchrysazin in place of the 56 g of 2,7-di-n-pentylchrysazin and increasing the quantity of the other ingredients by 25%. The quantity of dry product was 50.5 g (yield 69.1%) melting at 140° C. Elemental analysis gave C=58.8% (61.3%), H=5.4% (5.5%) and N=5.5% (6.0%).

(c) Preparation of 2,7-Di-n-heptyl-4,5-diaminochrysazin

The procedure of Example 1(c) was repeated using 27 g of 2,7-di-n-heptyl-4,5-dinitrochrysazin in place of the 6 g of 2,7-di-n-pentyl-4,5-dintrochrysazin and increasing the volume of water pyridine to 1 liter in the same proportions. The reduction liquor comprised 100 g sodium sulphide and 12 g of sulphur in 50 ml water. The quantity of product after recrystallisation from toluene was 20.9 g (yield 88.2%) melting at 140°–2° C. Elemental analysis gave C=72.4 (72.1), H=8.5 (8.2) and N=6.0 (6.0).

EXAMPLE 3

2,7-Di-n-hexyl-4,5-diaminochrysazin was made using the process of Example 1, but using the equivalent quantity of n-hexanal in place of the n-pentanal. The product melted at 138°–9° C. and the elemental analysis gave C=71.3 (71.2) H=7.8 (7.8) and N=5.9 (6.4). The structure was confirmed by NMR and mass spectral analyses and the purity by HPLC.

EXAMPLE 4

2,7-di-n-octyl-4,5-diaminochrysazin was prepared by the process of Example 1 but using the equivalent quantity of n-octanal in place of the n-pentanal. The product melted at 112°–4° C., the structure was confirmed by mass spectral and NMR analyses and the purity by HPLC.

EXAMPLE 5

(a) Preparation of Partially Methylated 2,7-Di-n-heptyl-4,5 diaminochrysazin

Boric acid (2.5 g) was stirred in 98% sulphuric acid (44 ml) at 20° C. for 30 minutes. To this mixture was added 2,7-di-n-heptyl-4,5-diaminochrysazin (8.63 g) and the wholestirred for a further 1 hour at 20° C. A mixture of water (5 g) and methanol (7.5 g) was added dropwise over 10 minutes and the mixture heated to 115° C. After 3 hours at 115° C. the temperature was raised to 120° C. and stirred at 120°±5° C. for 16 hours. The reaction mixture was then cooled to 20° C., drowned into a mixture of ice and water, filtered and the solid washed acid free and dried (yield 8.15 g). The dried product was reslurried in pyridine (80 ml) at 60° C., diluted with water (40 ml), cooled to 20° C., filtered, washed with water and dried (yield 7.3 g). It was finally extracted with 100–120 petroleum ether to yield 1.6 g of a solvent-soluble partially methylated derivative containing 2,7-di-n-heptyl-4,5-diaminochrysazin, 2,7-di-n-heptyl-4-amino-5-methylamino-chrysazin and 2,7-di-n-heptyl-4,5-di(methylamino)chrysazin.

(b) Preparation of 2,7-di-n-heptyl-4-amino-5-methylaminochrysazin (c) Preparation of 2,7-di-n-heptyl-4,5-di(methylamino)chrysazin The solvent soluble partially methylated derivative from Example 5(a) above was dissolved in toluene and passed down a silica gel column eluting firstly with toluene to achieve separation and then with 90:10 toluene:chloroform to speed recovery. The fractions containing the two main products were evaporated to dryness and separately slurried in 40-60 petroleum ether, filtered and dried. The structure of the product from the first fraction was confirmed by mass spectrometry as 2,7-di-n-heptyl-4,5-di(methylamino)chrysazin [5(c)], having an extinction coefficient of 22,100 at 575 nm. The structure of the product from the second fraction was confirmed by mass spectrometry as 2,7-di-n-heptyl-4-amino-5-methylaminochrysazin [5(b)], melting at 110°-2° C. and having an extinction coefficient of 19,522 at 675 nm.

EXAMPLE 6

The equivalent derivatives of 2,7-di-n-pentyl-4,5-diaminochrysazin (1c) were prepared by the method of Example 5 using the equivalent amount of 2,7-di-n-pentyl-4,5-diaminochrysazin (1c) in place of the 2,7-di-n-heptyl-4,5-diaminochrysazin (2c). The mixture of unmethylated and partially and fully methylated derivative (6a) was separated using the same method as Example 5. The monomethylated derivative (6b) had a melting point at 142°-5° C. and extinction coefficient of 23,785 at 675 nm. The dimethylated derivative (6c) had a melting pont at 158°-160° C.

EXAMPLE 7

2,7-Di-n-pentyl-4,5-diaminochrysazin (1c:11.74 g) was stirred in 98% sulphuric acid (32.6 ml) at 20° C. for 30 minutes. To this mixture was added dimethyl sulphate (14.1 ml) and the whole stirred at 150°-5° C. for 12.5 hours, during which a further 7.05 ml of dimethyl sulphate was added after 3 hours. The reaction mixture was then drowned into ice/water and the product filtered, washed acid free with water and dried (yield: 11.9 g).

The crude product was slurried in pyridine (220 ml) at 60° C., diluted with water (110 ml), cooled to 20° C., filtered, washed successively with 50/50 pyridine/water (20 ml) and water and dried (yield: 10.6 g).

The pyridine treated material was continuously extracted with 100–120 petroleum (200 ml) and ethyl acetate (50 ml) leaving 5.6 g of insoluble material. The solvent extracts (containing soluble material) were evaporated to dryness, washed with 40–60 petroleum, filtered and dried to yield 4.3 g of purified material (Product 7a).

A blend was prepared by dissolving 4.2 g of 7a and 1.26 g of 2,7-di-n-pentyl-4,5-diaminochrysazin (1c) in chloroform, evaporating to dryness and grinding the dry mixture in 40–60 petroleum until the solvent evaporated leaving 5.3 g of fine powder (Product 7b).

EXAMPLE 8

2,7-Di-n-pentyl-4,5-diaminochrysazin (1c:10.25 g) was added to a mixture of 98% sulphuric acid (250 g) and water (250 g) at 20° C. and the mixture heated to 80°-5° C. Formaldehyde solution (37%:4 ml) was added in 0.5 ml portions at 30 minute intervals and the temperature maintained at 80°-5° C. for a further 3 hours. The reaction mixture was then cooled to 20° C. and drowned into ice/water (21). The product was filtered, washed acid-free with water and dried to yield 10 g of Product 8.

HPLC analysis of the Products 7a, 7b and 8 showed them to have the following compositions:

| Product | (%) in Product of | | | max |
|---|---|---|---|---|
| | 1c | 6b | 6c | (nm) |
| 7a | 19 | 51 | 30 | 638 |
| 7b | 38 | 37 | 25 | 624 |

| Product | (%) in Product of | | | max |
|---|---|---|---|---|
| | 1c | 6b | 6c | (nm) |
| 8 | 44 | 46 | 10 | |

In the following 'Dye 1(c)' refers to the product of Example Example 1(c) and 'Dye 5(a)' the product of Example 5(a).

EXAMPLE 9

A black mixture dye was made by mixing together 8 parts of Dye 1(c) (blue), 15 parts of 2,7-di-n-hpetyl-4-phenylthio-5-(4-t-butylphenylthio)chrysazin (violet), which is the product of Example 5(d) in co-pending UK Patent Application No. 8223718 filed August 18, 1982 and 20 parts of 1-phenylthio-5-(4-t-butylphenylthio)anthraquinone (yellow) which is the product of Example 11 in UK Patent Specification No. 2094822A.

EXAMPLE 10

A black mixture dye was prepared using the same dyes as in Example 7, by mixing 12 parts of the blue dye, 20 parts of the violet dye and 30 parts of the yellow dye.

EXAMPLE 11

A black mixture was made by mixing together 10 parts of Dye 1(c) (blue), 10 parts of the violet dye used in Example 9, 20 parts of the yellow dye used in Example 9, 30 parts of 1,5-di(4-t-butylphenylthio)-4-phenylthioanthraquinone (orange) which is the product of Example 22 in UK Patent Specification No. 2094822A and 10 parts Dye 5(a) (blue-green), i.e. the partially methylated derivative of the blue dye used in Example 9 above.

Comparative dyes, with longer, shorter or branched alkyl chains or in accordance with Formula B, were made by equivalent processes, starting with the appropriate alkanal in place of the C5-8-n-alkanal used in the Examples and/or anthrarufin in place of the chrysazin used in the Examples.

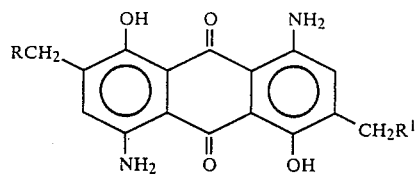

B

All products were recrystallised from petroleum ether or toluene until their purity exceeded 95% and their properties were assessed in various liquid crystal materials. The properties of the compounds of Formula I in typical liquid crystal materials are given in the following tables in comparison with some branched chain isomers, some lower and higher homologues and with some equivalent compounds in accordance with Formula B.

TABLE I

| Compounds of Formulae I & B in which R = R¹ and R² = R³ = H | | | |
|---|---|---|---|
| R & R¹ | Order Parameter (S) | Solubility (wt %) | Stability |
| Examples (Formula I) | | | |

TABLE I-continued

Compounds of Formulae I & B in which
R = R¹ and R² = R³ = H

| R & R¹ | Order Parameter (S) | Solubility (wt %) | Stability |
|---|---|---|---|
| n-butyl (1c) | 0.77 | 8.0 | 100 hr 97% |
|  |  |  | 2000 hr 73% |
| n-pentyl (3) | 0.76 | 4.3 | * |
| n-hexyl (2c) | 0.78 | 5.5 | 400 hr 92% |
|  |  |  | 2000 hr 87% |
| n-heptyl (4) | 0.73 | 13.0 | * |
| *Comparative Dyes (Formula I)* |  |  |  |
| iso-propyl | 0.72 | 1.6 | 400 hr 92% |
|  |  |  | 1500 hr 85% |
| —CH($C_2H_5$)$_2$ | 0.66 | * | * |
| —CH($CH_3$)$CH_2CH_3$ | 0.68 | * | * |
| —$C_2H_4$CH($CH_3$)$CH_2$C($CH_3$)$_3$ | 0.71 | 1.6 | * |
| n-octyl | 0.77 | 2.4 | * |
| n-nonyl | 0.76 | 1.0 | * |
| n-unadecyl | 0.80 | 0.3 | * |
| *Comparative Dyes (Formula B)* |  |  |  |
| iso-propyl | 0.69 | <2.0 | * |
| n-butyl | 0.76 | <0.1 | * |
| n-pentyl | 0.74 | <1.0 | * |
| n-hexyl | * | <0.01 | * |
| n-heptyl | 0.73 | <2.0 | * |

TABLE II

Compounds of Formula I in which R = R¹,
R² is methyl and R³ is H

| R & R¹ | Order Parameter (S) | Solubility (wt %) | Stability |
|---|---|---|---|
| *Examples* |  |  |  |
| n-butyl (6b) | 0.72 | 3.3 | * |
| n-hexyl (5b) | 0.68 | 0.5 | * |
| *Comparative Dye* |  |  |  |
| iso-propyl | 0.63 | * | * |

TABLE III

Compounds of Formula I in which R = R¹, R² = R³ = methyl

| R & R¹ | Order Parameter (S) | Solubility (wt %) | Stability |
|---|---|---|---|
| *Examples* |  |  |  |
| n-butyl (6c) | 0.66 | 0.9 | * |
| n-hexyl (5c) | 0.67 | 0.5 | * |
| *Comparative Dye* |  |  |  |
| iso-propyl | 0.54 | * | * |

TABLE IV

Mixtures of Compounds of Formula I in which R = R¹
and R² = R³ = H, R² = R³ = methyl and
R² = H and R³ = methyl

| R & R¹ | Order Parameter (S) | Solubility (wt %) | Stability |
|---|---|---|---|
| *Examples* |  |  |  |
| n-butyl (6a) | 0.74 | 8.7 | * |
| n-hexyl (5a) | 0.77 | 3.4 | * |
| *Comparative Dye* |  |  |  |
| iso-propyl | 0.63 | * | * |

TABLE V

Compounds of Formula I in which R = R¹ and R² = R³ = H in other Liquid Crystal Materials

| | Liquid Crystal Material | | | | | |
|---|---|---|---|---|---|---|
| | 1132 | | 1695 | | FBCO Ester | |
| R & R¹ | S | Sol | S | Sol | S | Sol |
| n-butyl (1c) | 0.77 | 10.0 | 0.79 | 6.5 | 0.69 | 3 |
| n-hexyl (2c) | 0.78 | 7.0 | 0.80 | * | 0.70 | 3 |
| *Comparative Dye* | | | | | | |
| iso-propyl | 0.73 | 3.0 | 0.79 | * | 0.62 | 1 |

| | PECH | |
|---|---|---|
| | S | Sol |
| n-butyl (1c) | 0.80 | 3.7 |

Notes on Tables I to V
(i) Order parameters, solubilities and stabilities reported in Tables I to V were measured in the liquid crystal material, E 43, which is referred to as Host B in UK Specification No 2081740A and is available from BDH Ltd of Poole, Dorset. Measurements were made at 20° C. unless otherwise indicated.
(ii) Stabilities were measured as the percentage decrease in absorption at the absorption maximum after the indicated period of irradiation with a 1 kW phosphor-coated, mercury vapour lamp at 30° C.
(iii) In Table V "S" means order parameter and "Sol" means solubility (wt %) in the appropriate liquid crystal material.
(iv) *indicates that the property was not measured.
(v) Figures in brackets after the designation of the dye - eg '(1c)' after 'n-butyl' under the heading of Examples (Formula I) of Table I - denotes the dye product of the Example of that number.
(vi) ZLI 1132: Host C of UK Patent Specification No 2081736A (available from E Merck Co., Darmstadt, W Germany).
ZLI 1695: available from E Merck Co;
FBCO Ester: Host 12 of UK Patent Specification No 2093475A (this is a host of negative dielectric anisotropy).
PECH: this has the following composition

| Compound | Percentage by Weight |
|---|---|
| n-$C_3H_7$—⟨H⟩—$CH_2.CH_2$—⟨O⟩—CN | 32 |
| n-$C_5H_{11}$—⟨H⟩—$CH_2.CH_2$—⟨O⟩—CN | 30 |
| n-$C_7H_{15}$—⟨H⟩—$CH_2.CH_2$—⟨O⟩—CN | 19 |
| n-$C_3H_7$—⟨H⟩—$CH_2.CH_2$—⟨O⟩—⟨O⟩—CN | 19 |

Figures 2, 3:
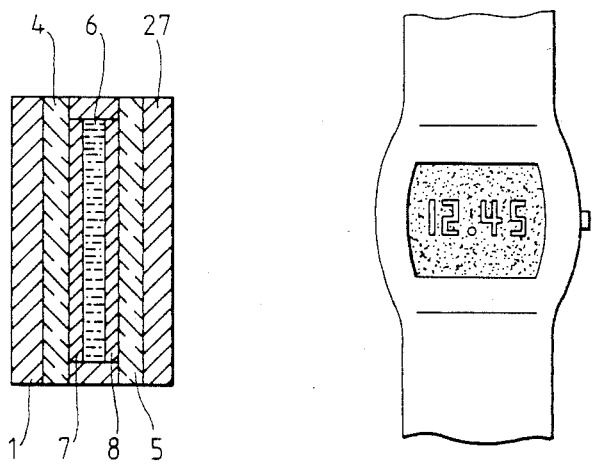

Examples of liquid crystal devices embodying the second aspect of the present invention will now be described with reference to the accompanying drawings in which:

FIG. 1 is an exploded view of a Fréedericksz effect display device embodying the present invention, FIG. 2 is a sectional view of the device shown in FIG. 1; and FIG. 3 is a front view of a watch having a liquid crystal display constructed as shown in FIGS. 1 and 2.

As shown in FIG. 1 a liquid crystal display of the Fréedericksz effect (positive nematic) type includes a liquid crystal cell 3 comprising two glass slides 4, 5 containing a layer of liquid crystal material 6 which is basically a positive nematic material together with a pleochroic dye. Electrodes 7, 8 eg of tin oxide are arranged on the inner faces of the slides 4, 5. A brushed aluminium reflector 27 may be located behind the slide 5.

Prior to assembling the cell 3 the slides 4, 5 (already bearing the electrodes 7, 8) are coated on their inner faces with silicon monoxide or magnesium fluoride. This coating is formed by evaporating a stream of eg silicon monoxide onto the slide at an angle of about 5° to the surface as for example described in UK Patent Specification No. 1,454,296. On assembly the slides are arranged with the evaporation direction on the two slides 4, 5 parallel to one another. With such coatings applied liquid crystal molecules at the coated surfaces lie in a single direction (parallel to the evaporation direction) and at an angle of about 25° to 35° typically about 3° to the adjacent slide surface. As a result the liquid crystal molecules lie in a parallel homogeneous texture as indicated by arrow 13 (FIG. 1). The dye molecules in guesthost relationship with the liquid crystal molecules are also roughly in this texture giving a relatively strongly coloured appearance to the cell 3 (which is black or grey if the dye absorbs uniformly throughout the visible spectrum.

A single polariser 1 placed in front of, or behind, the cell 3 (shown in front in FIG. 1) with its transmission axis parallel to the alignment direction of the liquid crystal material 6, will enhance the colour of the display in this state, the "off" state. By this arrangement the electric vector of the incident or reflected light is confined roughly parallel to the transition of the dye molecules.

When a suitable voltage, eg a few volts, (greater than the threshold to give the effect) is applied between the electrodes 7 and 8, ie to give the "on" state, the molecules of the liquid crystal material are switched to the homeotropic texture, ie to lie parallel to the electric field along an axis perpendicular to the slides 4, 5. The dye molecules are also switched to this texture by the guest-host effect and have their long axes essentially parallel (ie they are essentially "end-on") to light incident on the cell 3 in a direction perpendicular to the slides 4, 5, effectively reducing their absorption of ambient light. This gives the cell 3 a relatively clear or weakly coloured appearance.

If the electrodes 7 and 8 cover only part of the inner surface of the slides 4 and 5 respectively the entire cell 3 will appear strongly coloured (ie strongly reflects) in the "off" state whereas in the "on" state only the region of the liquid crystal material 6 between the electrodes 7, 8 will appear clear or weakly coloured in the "on" state the remainder of the cell 3 appearing strongly coloured, ie remaining in the "off" state. (If the pleochroic dye absorbs uniformly throughout the visible spectrum the strong colouration will appear black or grey.)

Thus, by shaping the electrodes 7, 8 into discrete facing parts, eg bars of a digit separately connectable to a voltage source (not shown), symbols or letters may be displayed. This may be achieved by photoetching (in a known way) the layers, eg $SnO_2$, used to form the electrodes 7, 8 prior to assembly.

For example, in the watch display of FIG. 3 the electrodes 7, 8 are shaped to provide four seven bar numeric digits to display time; eg the digits are displaying 12.45 as shown in FIG. 3. A pulsed period dot P is also included, as in conventional watch displays, to indicate operation of the display.

Examples of suitable dyed liquid crystal material for use as the material 6 above is the black dye mixture described in Example 9, 10 or 11 dissolved in the host E43 (the thickness of the material 6 layer being 12 μm).

In an alternative device embodying the present invention a cholesteric to nematic phase change effect device is made in a known way. The method of construction is the same as that described above with reference to FIGS. 1 to 3 except that no $MgF_2$ or SiO coating is applied to the inner surfaces of the electrode bearing slides 4, 5, no polariser 1 is required and the liquid crystal material 6 in this case is essentially a long pitch cholesteric material (having a molecular helical pitch of the order of about 2 μm containing a pleochroic dye). A suitable material is one of the host E43 containing Dye Mixture 1, 2 or 3 defined above (as used in the specific Fréedericksz effect device described with reference to FIGS. 1 to 3) (the thickness of the material 6 layer again being 12 μm).

In the "off" state (with no voltage applied) the cell 3 again appears strongly coloured in this case (as in the Fréedericksz effect device). The liquid crystal material 6 in this state is in the focal conic texture which comprises an arrangement of random molecular helices. The dye molecules take up the same arrangement by the guest-host effect. The strong colouration (which may be black or dark grey) is because ambient white light incident on the material 6 via the slide 4 is partially absorbed by the dye molecules which are perpendicular or oblique to the light propagation direction.

In the "on" state a voltage (typically 10–15 volts) is applied between the electrodes 7, 8 sufficient to give the homeotropic texture, ie with the liquid crystal molecules between the electrodes 7, 8 essentially re-orientated to lie perpendicular to the slides 4, 5. The dye molecules between the electrodes 7, 8 are re-orientated to this arrangement by the guest-host effect. The region between the electrodes 7, 8 appears clear or weakly coloured in this state (as with the Fréedericksz effect device) because the dye molecules are essentially "end-on" to ambient light propagating in a direction perpendicular to the cell 3, ie perpendicular to the slides 4, 5 (via the slide 4).

A suitable host in this case is either E43 specified above (96% by weight) plus CB 15 (4% by weight). The black dye mixture described in Example 9, 10 or 11 may be used as the guest dye.

CB 15 is the compound

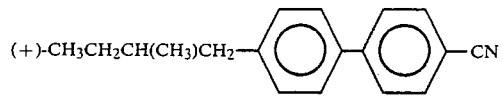

supplied by BDH Chemicals Ltd.

We claim:

1. A material suitable for a guest-host liquid crystal device comprising a solution of a liquid crystal material and a pleochroic dye characterised in that the dye comprises at least one anthraquinone compound free from water-solubilising and ionic substituents and having the formula:

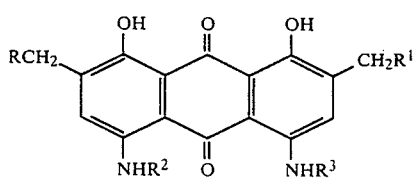

Formula I wherein each of R and $R^1$ independently represents an n-alkyl group having from 4 to 7 carbon atoms inclusive and wherein each of $R^2$ and $R^3$ is independently selected from hydrogen and alkyl groups having from 1 to 4 carbon atoms inclusive.

2. A material according to claim 1 and wherein the liquid crystal material comprises at least 90% by weight of the solution.

3. A material according to claim 1 and wherein the liquid crystal material has a positive dielectric anisotropy.

4. A material according to claim 1 and wherein the liquid crystal material has a negative dielectric anisotropy.

5. A material according to claim 1 and wherein the groups R and $R^1$ in Formula I specified in claim 1 are the same.

6. A material according to claim 5 and wherein the groups $R^2$ and $R^3$ in Formula I are both hydrogen.

7. A material according to claim 6 and wherein the compound of Formula I has the formula:

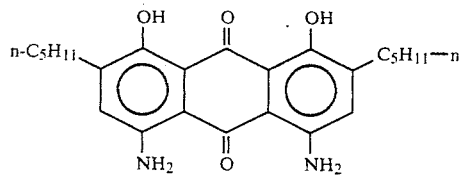

8. A material according to claim 6 and wherein the compound of Formula I has the formula:

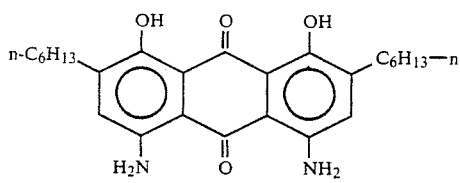

9. A material according to claim 6 and wherein the compound of Formula I has the formula:

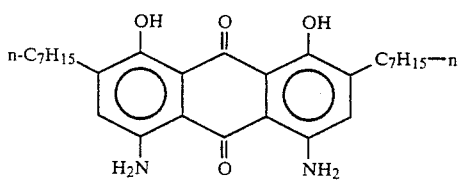

10. A material according to claim 6 and wherein the compound of Formula I has the formula:

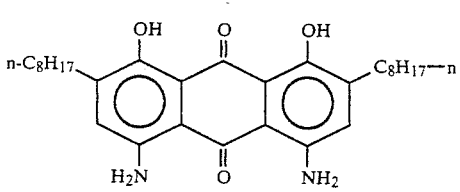

11. A material according to claim 1 and wherein at least one of the groups $R^2$ and $R^3$ represents $C_{1-4}$-alkyl.

12. A material according to claim 11 and wherein the groups $R^1$ and $R^2$ in Formula I are identical and are selected from n-butyl and n-hexyl, $R^2$ is H and $R^3$ is $C_{1-4}$-alkyl.

13. A material according to claim 12 and wherein the pleochroic dye is a mixture of compounds at least one of which is as specified in claim 12.

14. A material according to claim 13 and wherein the pleochroic dye is a mixture of compounds at least one of which is of Formula I wherein R and $R^1$ are the same and are selected from n-butyl and n-hexyl, one of $R^2$ and $R^3$ is H and the other is $C_{1-4}$-alkyl.

15. A material according to claim 14 and wherein the mixture also includes at least one compound of Formula I wherein R and $R^1$ are the same and are selected from n-butyl and n-hexyl and $R^2$ and $R^3$ are both $C_{1-4}$-alkyl.

16. A material according to claim 14 and wherein the different compounds having Formula I both or all have the same groups R and $R^1$.

17. A material according to claim 1, and wherein any compound of Formula I incorporated in the material and having $R^2$ or $R^3$ or both representing a $C_{1-4}$-alkyl group, the $C_{1-4}$-alkyl group is methyl.

18. A material according to claim 1 and wherein the liquid crystal material comprises a mixture of cyanobiphenyls together with a material having a clearing point greater than 80° C.

19. A material according to claim 1 and wherein the liquid crystal material comprises a mixture of cyanophenyl cyclohexane compounds together with a material having a clearing point greater than 80° C.

20. A material according to claim 1, wherein the liquid crystal material comprises a mixture of esters having the general formula:

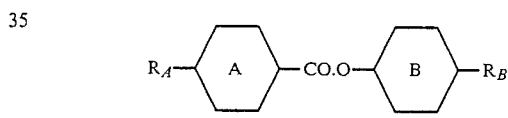

wherein

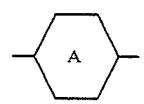

is bicyclo (2,2,2) octane and

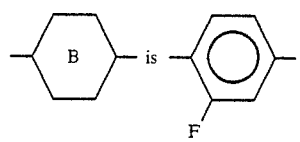

and wherein $R_A$ and $R_B$ are alkyl substituents.

21. A material according to claim 1, wherein the liquid crystal material comprises a mixture of compounds having the formula:

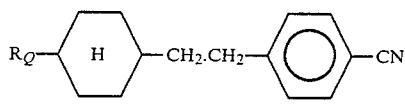

where $R_Q$ is $C_{2-9}$ n-alkyl, together with a material having a clearing point greater than 80° C.

22. A material according to claim 1 and wherein for each compound contained in the dye the product of molar extinction coefficient and the solutibility of the dye in moles per liter is at least 500 cm$^{-1}$.

23. A material according to claim 1 and wherein each compound contained in the pleochroic dye forms between 0.5 and 10 percent by weight of the material.

24. A material according to claim 1 and wherein each compound contained in the pleochroic dye forms between 0.5 and 5 percent by weight of the material.

25. A material according to claim 1 and wherein the pleochroic dye comprises a mixture of dyes of a different colour, at least one of which is a dye compound of Formula I as defined in claim 1.

26. A material according to claim 25 and wherein the pleochroic dye includes a mixture of a blue dye, a purple or red/purple dye and a yellow dye, the blue dye being a compound of Formula I.

27. A material according to claim 6 and wherein the mixture also includes any orange dye and comprises a neutral coloured mixture.

28. A material according to claim 25, and wherein the pleochroic dye comprises a neutral coloured mixture of a yellow dye, a red or purple/red dye, a blue dye and a blue/green dye, the blue dye and the blue/green dye being compounds of Formula I.

29. A material according to 28, wherein the yellow dye has the following general formula:

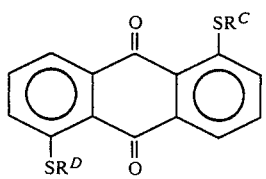

wherein said formula S is sulphur and $R^C$ and $R^D$ are aryl.

30. A material according to 26, wherein the dye mixture includes a red/purple dye having the following general formula:

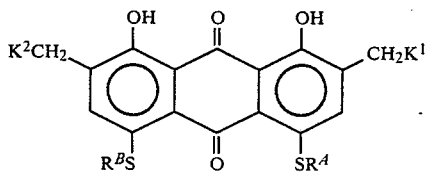

wherein said formula $K^1$ and $K^2$ represent alkyl groups, S is sulphur, and $R^A$ and $R^B$ represent aryl groups.

31. A material according to claim 1, and wherein the liquid crystal material is suitable for a cholesteric to nematic phase change effect device and comprises a nematic liquid crystal material together with a chiral agent.

32. A liquid crystal electro-optical device including two electrically insulating substrates at least one of which is optically transparent, electrodes on the inner surfaces of the substrates and a film of dielectric material contained between the substrates, wherein the improvement comprises the dielectric material being a dyed liquid crystal material according to claim 1.

33. A liquid crystal device according to claim 32 and wherein the device is a cholesteric to nematic phase change effect device.

34. A liquid crystal device according to claim 32 and wherein the device is a Fréedericksz effect device.

35. A liquid crystal device according to claim 32 and wherein the device is a twisted nematic effect device.

36. A material suitable for a guest-host liquid crystal device consisting of a solution composed of a liquid crystal material and a pleochroic dye wherein said dye is at least one anthraquinone compound which compound is water-solubilizing-ionic-substituents-free, said compound having the following formula:

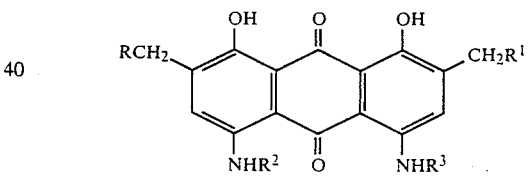

wherein said formula each of R and $R^1$ independently represents an n-alkyl group having 4 to 7 carbon atoms inclusive and wherein each of $R^2$ and $R^3$ is independently selected from hydrogen or alkyl groups having from 1 to 4 carbon atoms inclusive.

* * * * *